US008434174B2

(12) United States Patent
Patterson et al.

(10) Patent No.: US 8,434,174 B2
(45) **Date of Patent: *May 7, 2013**

(54) STEERING SYSTEM FOR PATIENT TRANSFER DEVICE

(75) Inventors: Richard A. Patterson, Georgetown, TX (US); Lawrence R. Gravell, Austin, TX (US)

(73) Assignee: MediGLIDER Corp., Austin, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 13/492,807

(22) Filed: Jun. 9, 2012

(65) Prior Publication Data

US 2012/0247842 A1 Oct. 4, 2012

Related U.S. Application Data

(63) Continuation of application No. 12/188,847, filed on Aug. 8, 2008, now Pat. No. 8,214,943, which is a continuation-in-part of application No. 11/837,671, filed on Aug. 13, 2007, now Pat. No. 7,861,336, which is a continuation-in-part of application No. 11/534,535, filed on Sep. 22, 2006, now Pat. No. 7,540,044, which is a continuation-in-part of application No. 11/246,426, filed on Oct. 7, 2005, now Pat. No. 7,603,729.

(51) Int. Cl.
*B62D 5/06* (2006.01)

(52) U.S. Cl.
USPC ........................... 5/81.1 R; 5/86.1; 5/81.1 HS

(58) Field of Classification Search ................. 5/81.1 R, 5/86.1, 81.1 HS; 280/771, 91.1
See application file for complete search history.

(56) References Cited

U.S. PATENT DOCUMENTS

| | | | |
|---|---|---|---|
| 2,480,737 | A | 8/1949 | Jayle |
| 2,528,048 | A | 10/1950 | Gilleland |

(Continued)

FOREIGN PATENT DOCUMENTS

| | | |
|---|---|---|
| DE | 10023729 | 1/2002 |
| JP | 1230357 | 9/1989 |

(Continued)

OTHER PUBLICATIONS

Linkage Mechanism Simulator [online], retrieved on Dec. 21, 2008 from the Internet URL: http://www.edu-ctr.pref.kanagawa.jp/LinkWeb/index_e.htm.

(Continued)

*Primary Examiner* — William Kelleher
(74) *Attorney, Agent, or Firm* — Jack V. Musgrove

(57) ABSTRACT

A table assembly for a patient transfer device has an upper table with side plates that are differentially extended at the ends, and valve control for pneumatic tubing integrated with refraction of the side plates. During patient delivery only the delivery side plate is raised, to avoid catching linens in the nip formed between upper and lower belts. A slide assembly supporting the table assembly includes a fixed plate, an intermediate plate, and a full-motion plate which extend by means of rack-and-pinion drives. Each plate is symmetrical, and pinions are symmetrically located on opposite sides of the fixed or intermediate plate to allow hyperextension to either the left or right. Improved steerage for the device is provided by two centerline wheels which counter-rotate from a straight position to a lateral position wherein the wheels are orthogonal to the longitudinal centerline of the device.

3 Claims, 13 Drawing Sheets

U.S. PATENT DOCUMENTS

| | | | | | |
|---|---|---|---|---|---|
| 3,077,354 | A | * | 2/1963 | Rateau | 280/99 |
| 3,213,882 | A | | 10/1965 | Beatty | |
| 3,304,116 | A | * | 2/1967 | Stryker | 296/20 |
| 3,418,670 | A | | 12/1968 | Morgan | |
| 3,593,351 | A | | 7/1971 | Dove | |
| 3,669,466 | A | * | 6/1972 | Spence | 180/409 |
| RE28,056 | E | | 6/1974 | Stevens | |
| 3,820,111 | A | * | 6/1974 | Candy | 341/156 |
| 3,871,036 | A | | 3/1975 | Attenburrow | |
| 3,947,902 | A | | 4/1976 | Conde et al. | |
| 3,967,328 | A | | 7/1976 | Cox | |
| 4,008,783 | A | * | 2/1977 | Herrmann et al. | 180/411 |
| 4,019,772 | A | | 4/1977 | Lee | |
| 4,073,016 | A | | 2/1978 | Koll | |
| 4,077,073 | A | | 3/1978 | Koll et al. | |
| 4,087,873 | A | | 5/1978 | Ohkawa | |
| 4,248,444 | A | | 2/1981 | Johnson | |
| 4,297,753 | A | | 11/1981 | Langren | |
| 4,300,782 | A | | 11/1981 | Pioth | |
| 4,631,761 | A | | 12/1986 | Lederman | |
| 4,646,860 | A | | 3/1987 | Owens et al. | |
| 4,669,137 | A | | 6/1987 | Schnelle et al. | |
| 4,747,170 | A | | 5/1988 | Knouse | |
| 4,761,841 | A | | 8/1988 | Larsen | |
| 4,794,655 | A | | 1/1989 | Ooka et al. | |
| 4,803,744 | A | | 2/1989 | Peck et al. | |
| 4,839,933 | A | | 6/1989 | Plewright et al. | |
| 4,868,938 | A | | 9/1989 | Knouse | |
| 4,914,769 | A | | 4/1990 | Kume et al. | |
| 4,922,574 | A | | 5/1990 | Heiligenthal et al. | |
| 4,934,726 | A | * | 6/1990 | Daenens et al. | 280/408 |
| 4,987,623 | A | | 1/1991 | Stryker et al. | |
| 5,033,763 | A | * | 7/1991 | Daenens et al. | 280/426 |
| 5,048,133 | A | | 9/1991 | Iura et al. | |
| 5,069,465 | A | | 12/1991 | Stryker et al. | |
| 5,090,512 | A | * | 2/1992 | Mullet et al. | 180/236 |
| 5,163,189 | A | | 11/1992 | DeGray | |
| 5,185,894 | A | | 2/1993 | Bastert et al. | |
| 5,238,350 | A | | 8/1993 | Krieg et al. | |
| 5,257,425 | A | | 11/1993 | Shinabarger | |
| 5,335,651 | A | | 8/1994 | Foster et al. | |
| 5,428,851 | A | | 7/1995 | Shore et al. | |
| 5,522,100 | A | | 6/1996 | Schilling et al. | |
| 5,540,321 | A | | 7/1996 | Foster | |
| 5,737,781 | A | | 4/1998 | Votel | |
| 5,771,513 | A | | 6/1998 | Kirchgeorg et al. | |
| 5,850,642 | A | | 12/1998 | Foster | |
| 5,890,238 | A | | 4/1999 | Votel | |
| 5,937,456 | A | * | 8/1999 | Norris | 5/88.1 |
| 6,286,165 | B1 | * | 9/2001 | Heimbrock et al. | 5/600 |
| 6,314,597 | B2 | | 11/2001 | Heimbrock et al. | |
| 6,354,394 | B1 | * | 3/2002 | Bauer-Nilsen | 180/409 |
| 6,374,435 | B1 | | 4/2002 | Leininger et al. | |
| 6,401,278 | B1 | * | 6/2002 | Hayes et al. | 5/600 |
| 6,438,776 | B2 | | 8/2002 | Ferrand et al. | |
| 6,598,247 | B1 | | 7/2003 | Heimbrock et al. | |
| 6,698,041 | B2 | | 3/2004 | VanSteenburg et al. | |
| 6,735,794 | B1 | | 5/2004 | Way et al. | |
| 6,792,630 | B1 | | 9/2004 | Palmatier et al. | |
| 6,857,143 | B2 | | 2/2005 | McNulty | |
| 6,932,209 | B2 | | 8/2005 | Kasagami et al. | |
| 7,000,268 | B2 | | 2/2006 | Johnson | |
| 7,200,881 | B2 | | 4/2007 | Kasagami et al. | |
| 7,210,176 | B2 | | 5/2007 | Weedling et al. | |
| 7,540,044 | B2 | | 6/2009 | Patterson et al. | |
| 7,954,828 | B2 | * | 6/2011 | Falk et al. | 280/33.994 |
| 2003/0182723 | A1 | | 10/2003 | Kasagami et al. | |
| 2005/0066442 | A1 | | 3/2005 | Kasagami et al. | |
| 2007/0074343 | A1 | | 4/2007 | McNulty | |

FOREIGN PATENT DOCUMENTS

| | | |
|---|---|---|
| JP | 8224273 | 9/1996 |
| JP | 2001104378 | 4/2001 |

OTHER PUBLICATIONS

MLA AT-2000 Patient Transfer System [online], from the Internet URL: http://www.ssl.gb.com/knight/mla_stretchairs.htm (2003).

* cited by examiner

STEERING SYSTEM FOR PATIENT TRANSFER DEVICE

CROSS-REFERENCE TO RELATED APPLICATION

This application is a continuation of U.S. patent application Ser. No. 12/188,847 filed Aug. 8, 2008, now U.S. Pat. No. 8,214,943 which is a continuation-in-part of U.S. patent application Ser. No. 11/837,671 filed Aug. 13, 2007, now U.S. Pat. No. 7,861,336, which is a continuation-in-part of U.S. patent application Ser. No. 11/534,535 filed Sep. 22, 2006, now U.S. Pat. No. 7,540,044, which is a continuation-in-part of U.S. patent application Ser. No. 11/246,426 filed Oct. 7, 2005, now U.S. Pat. No. 7,603,729, each of which is hereby incorporated.

BACKGROUND OF THE INVENTION

1. Field of the Invention

The present invention generally relates to devices for moving objects, and more particularly to a tray or table assembly for a patient transfer device wherein the table assembly includes upper and lower tables having counter-rotating, endless belts.

2. Description of the Related Art

A wide variety of products have been designed to move objects from one location to another and, in particular, transfer mobility-impaired individuals such as patients. In a hospital setting, patients must often be transported from their beds to an examination table or operating table, and back again. Basic devices for transferring patients include stretchers that are carried manually by two attendants, and wheeled gurneys that can more easily be handled by a single attendant.

There can still be problems, however, in getting a patient from a bed or other support surface onto a stretcher or gurney. If the patient is cooperative and not injured or disabled, it is a simple matter for the individual to slide over to the gurney with the assistance of a nurse, but if the patient is unconscious or has a disability or an injury (e.g., a broken bone) that might be worsened by movement, then great care must be taken in transferring the patient from the bed to the gurney. This problem is exacerbated when the patient is unusually heavy.

One solution to this problem is to slide a tray or sheet under the person and then, after the person is resting atop it, pull the tray or sheet off the bed and onto the gurney. A rigid tray can be forcibly inserted between the patient and the bed, and a sheet can be incrementally pushed under the person by first rocking him away from the gurney and then rocking back toward the gurney as the sheet is drawn under. This approach can still be difficult if the patient is uncooperative (i.e., unconscious), and can further be very uncomfortable even if the patient is cooperative, due to the frictional engagement of the tray with the body or the lack of firm support by the sheet.

Some transfer devices incorporate a rigid tray into the gurney that can move to the side and slide under a patient, and then slide back (while supporting the patient) to a centered position for transportation. In a further variation on this concept, the transfer device may use counter-rotating, endless belts to substantially eliminate friction against both the patient and the bed as support trays crawl under the patient. One example of such a design is shown in U.S. Pat. No. 5,540,321. A first endless belt surrounds a set of upper trays and a second endless belt surrounds a set of lower trays, so the portions of the belts that are in contact (between the upper and lower tray sets) move in the same direction at the same rate as they counter-rotate. As the trays are inserted under the patient, the belt on the upper tray everts outwardly at the same rate as the translational movement of the trays to crawl under the patient without introducing any significant friction, and the belt on the lower tray similarly everts along the bed sheet. Once the patient is supported by the trays, the entire tray assembly is raised off the bed and the device can be rolled on casters to transport the patient.

There are still several serious problems with the counter-rotating belt designs. The entire transfer device (including the base and support members) moves as the trays are inserted under the patient, and the base must extend under the bed or table in order to prevent the device from tipping over when the patient is carried (see, e.g., FIG. 10 of '321 patent). Because of this limitation, such devices cannot be used in all settings, i.e., wherein there is insufficient clearance space under the bed or table (a situation becoming more common as more accouterments are added to beds and tables that occupy the space underneath). These devices further only allow loading and unloading along one side of the device, which can present problems when the patient is not suitably oriented (head-to-feet) on the device with respect to the bed or table. Designs such as that shown in the '321 patent are also not particularly comfortable as there is only a thin layer of the belt interposed between the patient and the hard surface of the metal support trays. Moreover, hospitals are becoming increasingly concerned with potential contamination from patient fluids, and the prior art belt-type transfer devices are difficult if not impossible to properly clean.

Another problem relates to the initial impact of the trays as they acquire a patient. The height of the trays and the large diameter edge rollers in the '321 design present an abrupt bump along the patient's side during acquisition, and result in a similar bumpy delivery of the patient back to a support surface. The tray can be inclined, for example as shown in U.S. Pat. No. 4,914,769, but a large angle of inclination makes it more difficult to acquire the patient and can increase patient discomfort during loading and unloading. It is also more likely that a patient will roll off the table assembly if the edge portions can incline downward.

In light of the foregoing, it would be desirable to devise an improved patient transfer device that provided more flexibility in deployment while still being easy to operate and maneuver. It would be further advantageous if the device were more comfortable for the patient, yet could still maintain the patient in a stabilized manner during transport.

SUMMARY OF THE INVENTION

It is therefore one object of the present invention to provide an improved table assembly for a patient transfer device wherein the table assembly includes upper and lower tables having counter-rotating, endless belts.

It is another object of the present invention to provide such a table assembly that can adjust the upper table geometry to more easily and comfortably acquire, transport and deliver a patient.

It is yet another object of the present invention to provide a slide assembly for the table assembly that allow hyperextension of the table from either side of the patient transfer device.

It is a another object of the present invention to provide such a table assembly that can acquire and deliver patients without pulling or entrapping the bed linens or articles of clothing being worn by the patient into the space between the upper and lower conveyor belts as the patient is being delivered to a surface.

The foregoing objects are achieved in an improved table assembly whose upper belt table has left and right side plates that may be differentially extended/retracted at the ends, and has valve control for tubing sections at the ends that deflate different portions of a comfort air mattress, wherein the valve control is integrated with the extension/retraction of the side plates. In this manner the system for supplying pressurized air to the air mattress is greatly simplified, and the air mattress may be quickly inflated and deflated during different stages of patient acquisition or delivery.

During the patient delivery process, the upper belt table raises only one of the left/right side plate edges (the delivery side) while maintaining the other side edge in forcible contact with the lower table to avoid catching clothing or linens in the nip formed between the upper and lower belts. The delivery side plate is maintained in a slightly raised position using adjustable slot brackets which guide positioning posts on the ends of the side plate. The adjustable slot brackets pivot and are selectively retained in an upward position by solenoid-controlled latches.

A hyper-extending slide assembly supports the table assembly and includes a fixed plate, an intermediate plate, and a full-motion plate. The three plates extend by means of multiple sets of rack-and-pinion drives, and two horizontal bars are used to support and guide the intermediate and full-motion plates. Each of the plates is symmetrical, and pairs of pinions are symmetrically located on opposite sides of a transverse centerline of the fixed or intermediate plate. In this manner the table assembly can hyperextend to either the left or right side by simply changing the polarity of the motor coupled to the primary pinions.

Improved steerage may be provided for the patient transfer device comprising two centerline wheels which counter-rotate about vertical axes in synchronous motion from a straight position wherein the wheels are generally aligned with each other and with the longitudinal centerline of the chassis, to a turning position wherein the wheels are counter-rotated by an acute angle, and further to a lateral position wherein the wheels are counter-rotated until they are generally orthogonal to the longitudinal centerline of the chassis. A camming feature may advantageously be used to raise the wheels for stowage when they are fully rotated beyond their orthogonal position to a stowed position.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1A:
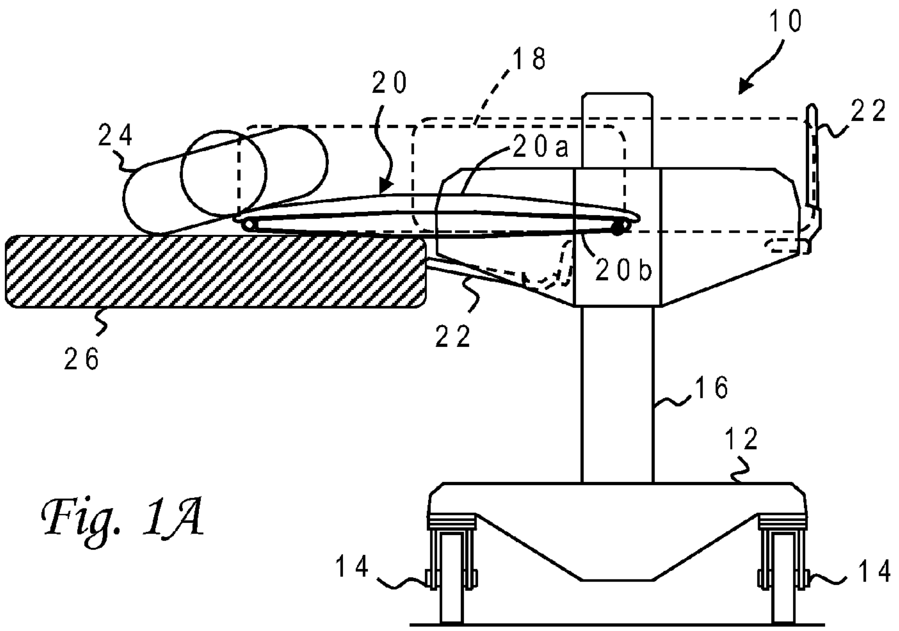
FIGS. 1A-1D are front elevational views of one embodiment of the patient transfer device of the present invention illustrating (i) patient acquisition, (ii) initial separation of the upper and lower tables of the table assembly while supporting the patient, (iii) further separation and partial retraction of the table assembly, and (iv) the separated table assembly supporting the patient at the centered (home) position for transport.

With reference now to the figures, and in particular with reference to FIGS. 1A-1D, there is depicted one embodiment 10 of a patient transfer device constructed in accordance with the present invention. Patient transfer device 10 is generally comprised of a frame or base 12 mounted on four or more wheels or casters 14, two vertical support members or columns 16 mounted on base 12 which contain powered elevating and lowering means for horizontal slide assemblies 18 attached to support columns 16 and to a belt table sub-frame (not shown) that maintains spacing and vertical alignment of the horizontal slide assemblies and also provides synchronized drive power to each slide assembly so they stay in alignment during the extension and retraction process, a table assembly 20 attached to slide assemblies 18, and side rails 22 attached to the belt table sub-frame.

FIG. 1A illustrates a patient acquisition position of slide assembly 18 and table assembly 20 wherein a leading edge of table assembly 20 has crawled about halfway under the patient 24 who is resting on a bed or other support surface 26. Table assembly 20 includes an upper table 20*a* and a lower table 20*b* each of which is surrounded by a respective endless belt or web. In the patient acquisition position, upper table 20*a* is in forcible contact with lower table 20*b*, and the upper and lower belts counter-rotate. The movement of slide assembly 18 may be synchronized with the belt drive mechanism so that the extending carriages slide sideways to or from the home position at a speed that matches the eversion rate of the upper and lower belts; however, in some cases the speed of the belts may be mis-matched to the eversion rate of the upper and lower belt tables by as much as 25% to reduce the tendency for the belts tables to create a pushing sensation on the patient during the acquisition process. In this manner, table assembly 20 can move under (or away from) the patient with essentially no frictional engagement between patient 24 and the upper belt, or between bed 26 and the lower belt and in doing so, only gently lift or lower the patient without pushing the patient to the side, and further performs this operation without requiring that base 12 also move sideways.

Figure 1B:
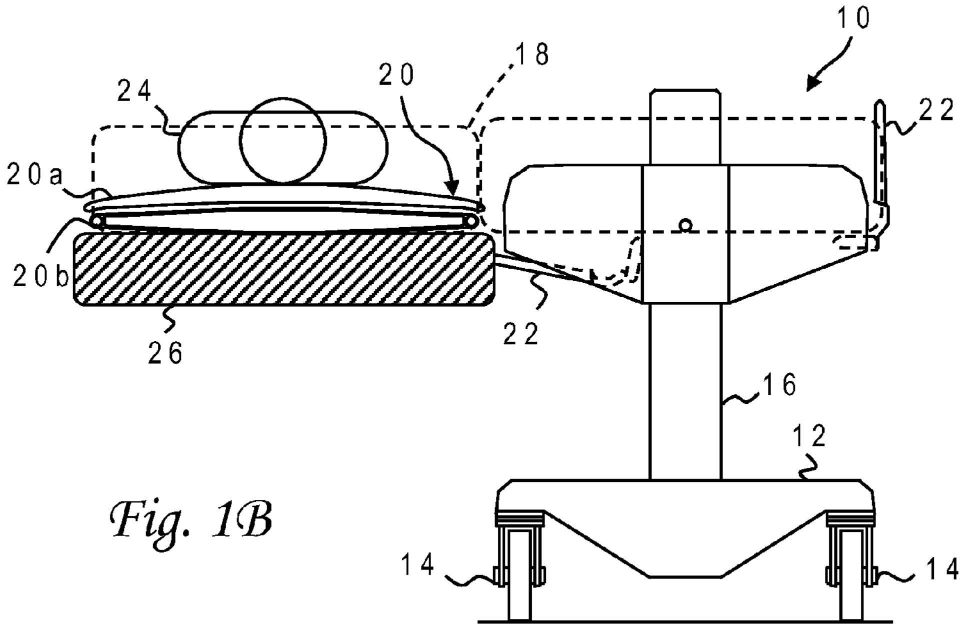

Once the patient is acquired, i.e., generally centered on top of table assembly 20 as shown in FIG. 1B, the side plates of upper table 20*a* are starting to retract to change the shape of the patient support surface of the upper belt table while still supporting the patient, and the drive between upper and lower belts is starting to be decoupled. As the side plates in the upper table are being retracted, left and right edge rollers (attached to the right and left side plates) of upper table 20*a* also retract, as described below in conjunction with FIGS. 3A-3C.

Figure 1C:
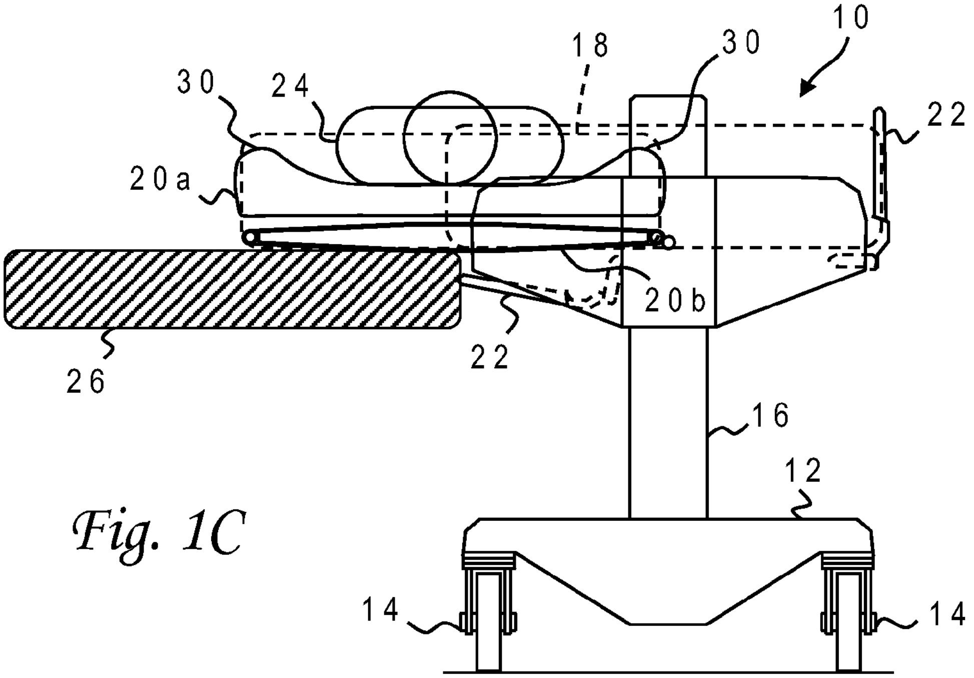

This retraction of the upper table side plates and edge rollers introduces slack into the upper belt which allows a shaped air mattress within upper table 20*a* to be inflated to prevent areas of high pressure against the patient's skin. FIG. 1C depicts table assembly 20 with the right and left side plate portions of the upper belt table 20*a* fully retracted and the upper belt fully decoupled from the lower belt portion of the lower belt table 20*b*, and the air mattress located in the upper belt table 20*a* inflated to its full shape by which side lobes 30 are formed in the upper belt. Side lobes 30 help prevent patient 24 from rolling off table assembly 20 as it moves to the home position, as well as during transport using patient transfer device 10. As further explained below, left and right edge sections of upper table 20*a* also change their downward inclination to a horizontal orientation which additionally raises side lobes 30 for patient transfer.

The decoupling of the pinch roller drive between the belts now allows the lower belt around lower table 20*b* to be driven in the reverse direction over the top surface of bed 26 while table assembly 20 moves toward the home position without engaging upper belt 20*a*, which would otherwise disrupt patient 24. The contact maintained between lower table 20*b* and bed 26 imparts stability so patient transfer device 10 will not tip over from the lateral weight of the patient as table assembly 20 moves back to the home position illustrated by FIG. 1D. This feature thus allows base 12 to be relatively narrow, i.e., the width of table assembly 20, without any portion of the base extending underneath bed 26. This design still takes advantage of counter-rotating belts to reduce frictional engagement while loading or unloading, but leaves the patient undisturbed on the upper table portion as the patient is safely transferred from the bed to the device.

Figure 1D:
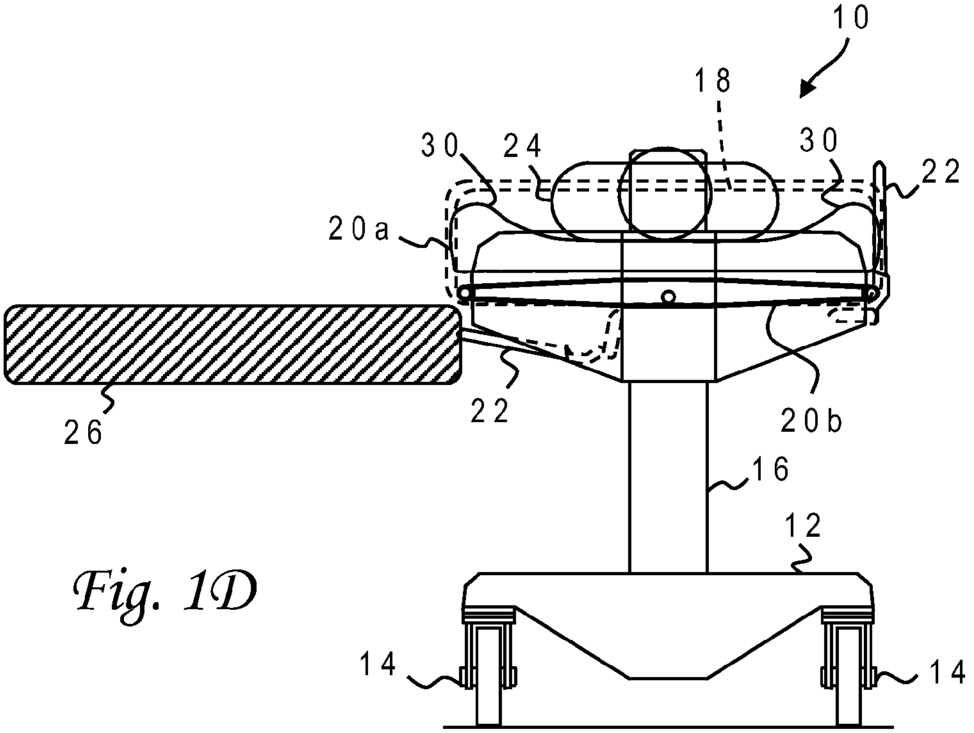

Once the patient is acquired and in the home position shown in FIG. 1D, side rails 22 are raised and patient transfer device 10 can be driven under its own power or pushed manually to another location and the patient delivered onto a support surface such as an operating table or another bed by simply reversing the acquisition process described above. Patient transfer device 10 may be placed along either side of the patient located on a bed or table, and the carriage slide in slide assembly 18 may include extensions such that the entire table assembly can move laterally up to 43" to the right or left for the device 10 that can move a 500 lb. patient. Similar devices can be built to transfer bariatric or heavier patients, and in these devices, the right or left extension of the slide assemblies will be greater. Device 10 may have multiple transportation modes, and is preferably provided with a pivoting handle to control steering such that a light pressure will make the device turn slightly while continuous force on the handle will make the device turn sharply at a 90° angle, such as for parking the device along a wall of a hallway or room. Various details relating to the construction of base 12, support columns 16, and slide assembly 18, the steerage of wheels 14, designs for the belts, foam padding, slip sheet and air mattress, exemplary dimensions, and other features can be found in U.S. patent application Ser. No. 11/246,426 which is hereby incorporated.

Figure 2:
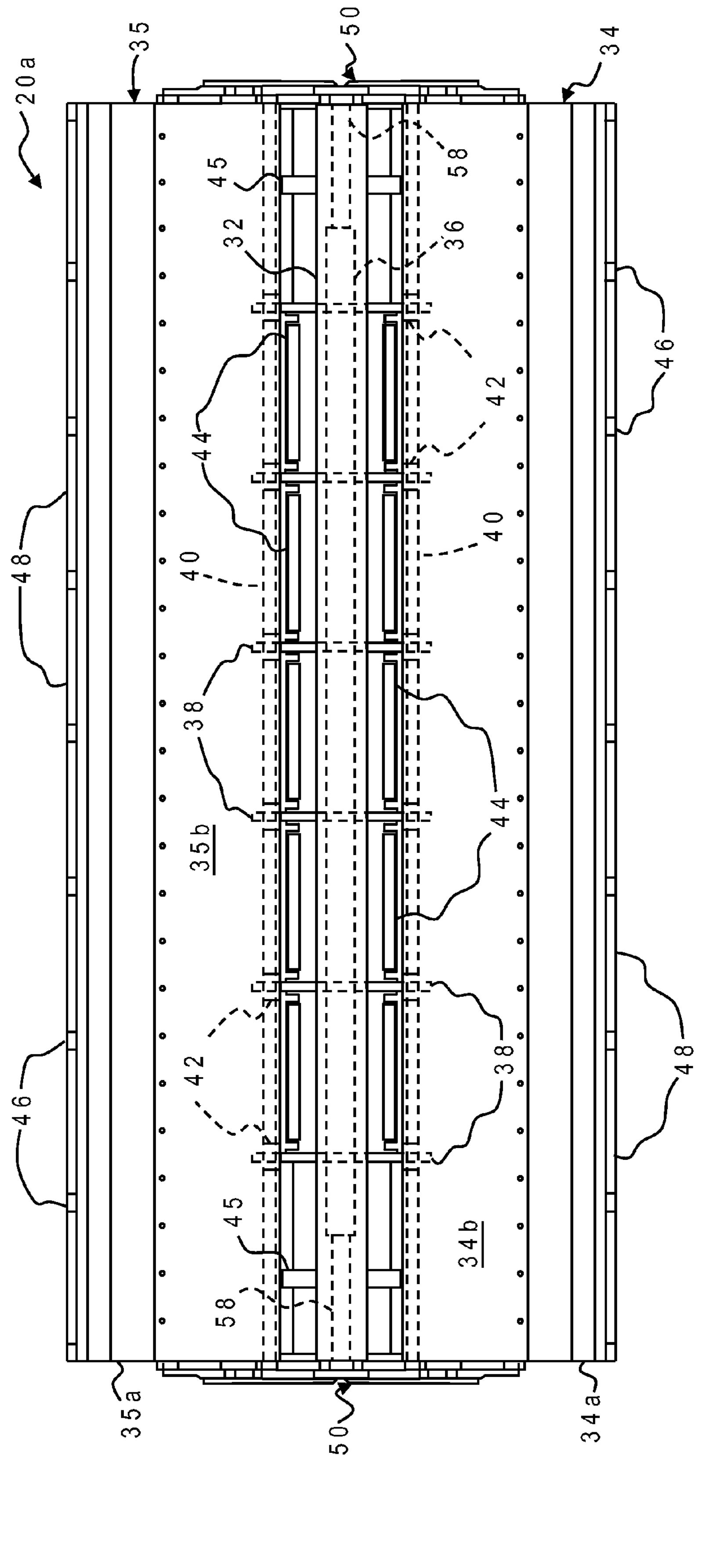
FIG. 2 is a top plan view of the top side of the upper table assembly used with the patient transfer device of FIG. 1 in accordance with one embodiment of the present invention, with the upper belt removed.

Referring now to FIG. 2, there is depicted a top plan view of upper table 20*a* with the upper belt removed to reveal internal details. In this embodiment, the primary patient support members of upper table 20*a* are a fixed central plate section 32, a movable left side plate section 34, and a movable right side plate section 35, each of which generally extends the full length (75") of upper table 20*a*. Plate sections 32, 34 and 35 are made of extruded aluminum. Central plate section 32 has a flat upper surface and two curved walls depending from its lower surface defining a semi-tubular channel 36. Central plate section 32 is 2.875" wide, nominally 0.25" thick, and channel 36 has an effective diameter of 1.125".

Left side plate section 34 is constructed of two separate portions 34*a*, 34*b* held together by screws and interlocking surfaces, and right side plate section 35 is similarly constructed of two separate portions 35*a*, 35*b* (in an alternative embodiment the side plate sections are unitary structures). The edge portions 34*a*, 35*a* have generally wedge-shaped transverse cross-sections and include integrally formed fingers 46 which support the axles of a plurality of edge rollers 48. The size of fingers 46 and edge rollers 48 is relatively small, e.g., 0.625" in diameter, and the thinnest region of edge portions 34*a*, 35*a* (which overlies edge rollers in lower table 20*b*) is 0.3" thick, which together present less of a bump as the patient is acquired or delivered. Edge rollers 48 are made of aluminum tubing and are 8.5" long. In the depicted embodiment there are sixteen edge rollers 48, i.e., eight along the left edge and eight along the right edge. The interior portions 34*b*, 35*b* also have generally wedge-shaped cross-sections but are slightly larger and hollow to reduce weight and accommodate the frame ribs described below when the side plate sections are retracted. Interior portions 34*b*, 35*b* have semi-tubular channels 40 formed therein near their inside edge. The walls of interior portions 34*b*, 35*b* are nominally 0.15" thick, channels 40 are 0.75" in diameter, and the maximum overall thickness of the wedge profile is 1.25". Each side plate section 34, 35 is 12" wide, and in the fully extended position of the side plate sections upper table 20*a* is 32" wide.

Holes are formed along the side walls of channel 36 to receive six transverse ribs 38 which are held in place with metal clips. The ends of ribs 38 also pass through channels 40 in interior portions 34*b*, 35*b* of the side plate sections and are secured by bearings 42 which loosely slide into channels 40 with sufficient tolerance to allow movement of the side plate sections. Ribs 38 are made of aluminum rods and are 8.5" long and 0.375" in diameter. The inside edges of interior portions 34*b*, 35*b* have integrally-formed flanges which support the axles of a plurality of pinch rollers 44. The flanges are inclined toward the bottom of upper table 20*a* so that pinch rollers 44 are in contact with the inside surface of the bottom portion of the upper belt. Pinch rollers 44 are made of aluminum tubing, and are 0.625" in diameter and 8.5" long. In the depicted embodiment there are ten pinch rollers 44, i.e., five on each side equidistant from the centerline of upper table 20*a*. Air tubes 45 are attached near the ends of central plate section 32 for filling the air mattress.

Figure 3A:
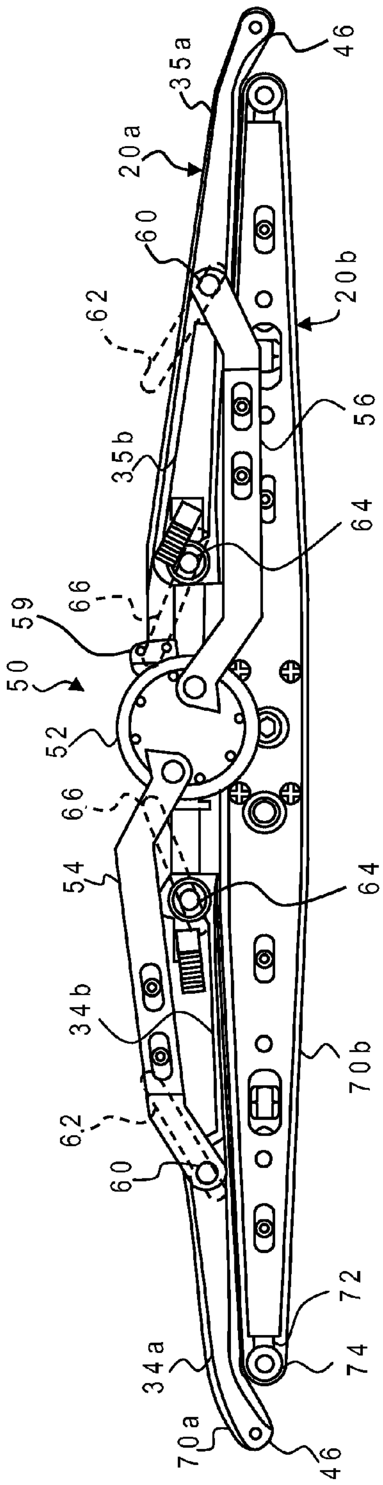
FIGS. 3A-3C are end front elevational views of the table assembly of FIG. 2 illustrating (i) the upper table with left and right side plates and edge rollers fully extended and the upper belt in forcible contact with the lower belt, (ii) an intermediate separation of the upper table from the lower table with the upper table edge rollers beginning to retract, and (iii) the fully retracted and separated configuration of the upper table.
Figure 3B:
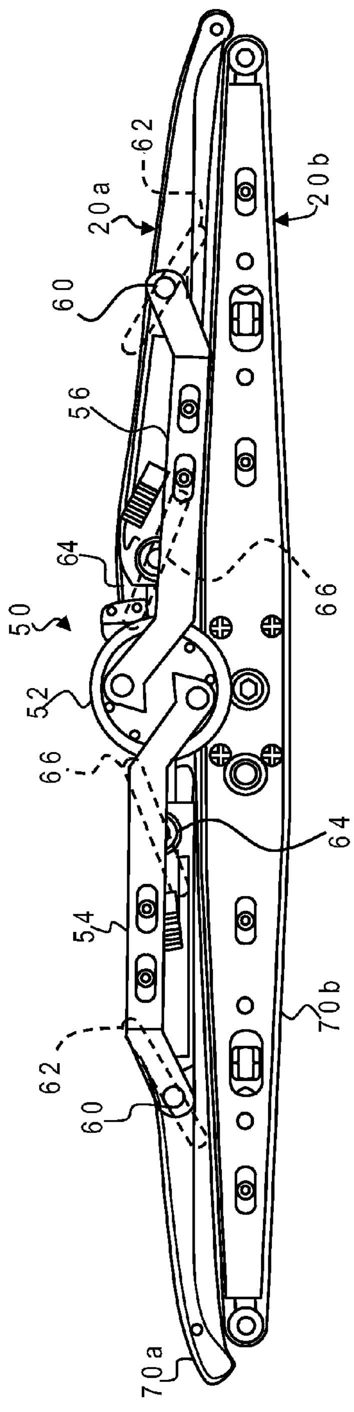
Figure 3C:
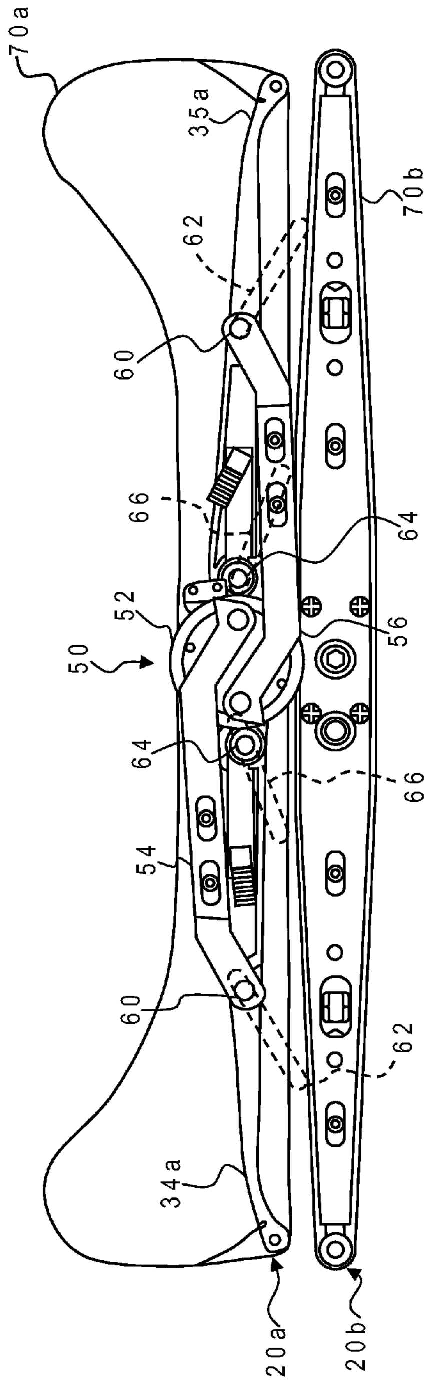

With further reference to FIGS. 3A-3C, left and right side plate sections 34, 35 are extended outwardly or retracted inwardly by the action of crank assemblies 50 located at the front and rear ends of upper table 20*a*. Each crank assembly 50 includes a rotating disk 52, a left linkage arm 54 and a right linkage arm 56. Disk 52 is constructed of steel, is 3" in diameter, and houses a 4:1 planetary gear drive coupled to an output shaft that is further connected to a planetary gear of a respective electric motor 58 (FIG. 2). The housing around the output shaft is inserted into an end of channel 36 in central plate section 32. In the exemplary embodiment motors 58 are 30 mm planetary gear motors manufactured by Dunker Motors (a division of Alcatel-Lucent in Bonndorf, Germany) with a torque of 1.8 N-m, and are responsive to an electronic control system which can selectively instruct the motor shaft to rotate at various speeds either clockwise or counterclockwise. Although the preferred embodiment provides such electronic actuation of the gears in disks 52, those skilled in the art will appreciate that the gears may alternatively be driven manually through appropriate mechanical linkages to a crank handle. It is desirable, but not necessary, to provide crank assemblies at each end to drive the side plate sections. Linkage arms 54, 56 may have a protrusion or beak portion which engages a switch sensor 59 mounted near disk 52 to provide feedback to the control electronics regarding the current position/orientation of disk 52.

Each linkage arm 54, 56 is preferably comprised of two separate pieces which are attached with pairs of bolts inserted in slots to provide some tolerance during the assembly of upper table 20*a*. The linkage arm pieces are constructed of aluminum. Linkage arms 54, 56 are pivotally attached at one end to a peripheral region of disk 52 such that, as disk 52 rotates, the attached end of a given linkage arm moves from one side of the disk to the other side. The plane of rotation of disk 52 is the same as the plane of movement of linkage arms 54, 56, viz., a vertical plane generally located at an end of table assembly 20. The ends of linkage arms 54, 56 attached to disk 52 are bent in opposite directions to accommodate their widths as the disk turns to an extreme rotation point, i.e., the pivotally attached end of linkage arm 54 is bent downward and the pivotally attached end of linkage arm 56 is bent upward, each at an angle of 45° with respect to the main extent of the linkage arms. Linkage arms 54, 56 have an effective length of 10". The other ends of linkage arms 54, 56 are pivotally attached to outer positioning posts 60. Posts 60 are press fit into the ends of respective left and right side plate sections 34, 35 at an outer point thereof (near the boundary between the edge portion and the interior portion). Thus, as disk 52 rotates clockwise or counter-clockwise, linkage arms 54, 56 pull or push left and right side plate sections 34, 35 via posts 60, thereby laterally retracting or extending edge rollers 48. Linkage arms have a stroke length of 1.875".

Figure 4:
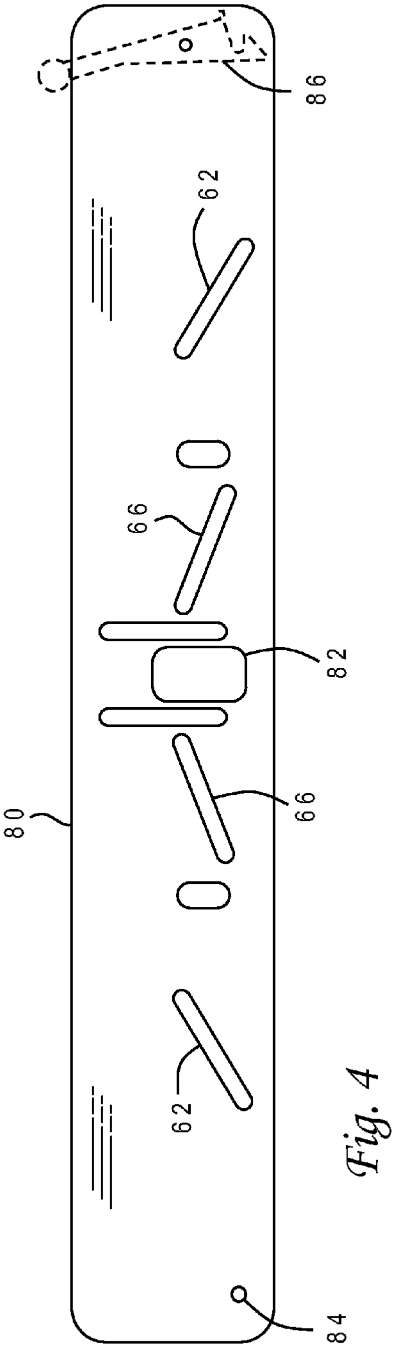
FIG. 4 is a front elevational view of the upper table end plate having guide slots which slidably retain positioning posts attached to ends of the retracting side plates in the upper table.

Outer positioning posts 60 pass through and are slidably retained by slots 62 formed in end plates of upper table 20*a*. One end plate 80 is shown in FIG. 4. Another pair of inner positioning posts 64 slide into lengthwise bores in side plate sections 34 and 35 and are attached with screws to the ends of respective channels 40 in left and right side plate sections 34, 35. Posts 64 pass through and are slidably retained by another pair of slots 66 formed in end plate 80. The position and orientation of left and right side plate sections 34, 35 are accordingly limited by guide slots 62, 66. End plate 80 also has a larger slot 82 which slidably receives a bushing of motor 58 mounted adjacent to disk 52. Other slots or holes may be provided for passage of electrical wiring or pneumatic tubes.

End plate 80 is pivotally attached to slide assembly 18 by a pin which passes through a hole 84 at one corner, while a latch 86 mounted at the other corner releasably secures end plate 80 to another pin of slide assembly 18. In this manner, the entire upper table 20*a* can be rotated upwardly 90° for cleaning or maintenance of the table assembly. End plate 80 is constructed of aluminum, and is 32.75" long, 4.5" wide and 0.25" thick.

FIG. 3A illustrates the almost fully extended position of side plate sections 34, 35 wherein fingers 46 and edge rollers 48 project 1.3" beyond the edges of lower table 20*b*. In this position, upper table 20*a* is in forcible contact with lower table 20*b*, that is, pinch rollers 44 are forcibly pressing upper belt 70*a* against lower belt 70*b* and opposing drive rollers inside lower belt 70*b*, such that any movement of the lower belt 70*b* will in turn drive the upper belt 70*a* through the frictional engagement of the belts' outer surfaces. Lower table 20*b* contains an internal framework (not shown) to which are mounted sets of belt support and the drive rollers. The drive rollers are rotated by two small-diameter planetary gear drive motors that are also mounted to the internal framework. The lower table framework is comprised of two trapezoidal-shaped, hollow aluminum extrusions 75" long by 12.5" wide. The thickness of the two extrusions tapers from 1.15" at one edge to 0.5" at the opposite edge. The nominal wall thickness of the extrusions is 0.15". The extrusions are adjustably mounted along their front and rear ends to slide assembly 18. The adjustable mounting for the two extrusions allows them to be moved laterally closer for installation of lower belt 70*b* and then moved apart for tensioning of lower belt 70*b*.

Eight roller supports 72 having a common shaft are positioned at regular intervals along the outside edge of each aluminum extrusion, and support seven drive rollers 74 on each side of lower table 70*b*. Drive rollers 74 are rubber covered, 8.75" long, and 0.774" in diameter. Each drive roller 74 contains a timing belt pulley located at one end. The pitch diameter of the timing belt pulley is selected so that the outside surface of a timing belt operating in the pulley is the same as the diameter of the rubber coating on the roller (0.774"). The thicker (inner) edge of each aluminum extrusion also contains seven bearing support blocks for mounting a second set of six larger diameter, rubber-covered drive rollers along an inner corridor of lower table 20*b*. An open space is left in this corridor at one end of the extrusion for mounting a drive motor. The inner drive rollers are 8.75" long and 1.729" in diameter. A single drive shaft passes through all six inner drive rollers and the seven bearing blocks attached to one extrusion. The drive rollers are keyed to the drive shaft so rotation of the shaft positively drives all of the rollers. Each drive shaft is coupled to a respective 1.653" outside diameter planetary gear motor, and torque restraints attach the motors to the wide edge of the extrusion. The drive motors are located in the open spaces at opposite side ends of the extrusions, with their output shafts oppositely directed. The drive rollers also contain a timing belt pulley at each end, aligned with the timing belt pulleys on five of the six idler rollers 74, so the timing belts can operate between these pulleys. Rotation of the planetary gear drive motor thus causes the drive shaft to rotate which in turn causes the drive rollers to rotate. Rotation of the drive rollers also drives the seven drive rollers 74 through the timing belts, all of which causes lower belt 70*b* to rotate.

Lower belt 70*b* may be provided with two flexible, inwardly-projecting V-shaped ribs, one near each end. The ribs ride in matching grooves formed in both ends of the aluminum extrusions, and also in matching grooves formed on the outer surfaces of four of the idler rollers 74 (at the four corners of lower table 20*b*). This arrangement prevents lower belt 70*b* from inadvertently tracking toward one end or the other as it is driven by the sets of idler and drive rollers. Plates constructed of a low friction material such as ultra-high molecular weight polyethylene may be mounted to the lower side of each aluminum extrusion between the timing belts to reduce the tension in the belt generated by sliding friction when table assembly 20 moves across a mattress or table surface.

When the patient is first acquired as shown in FIG. 1A, upper table 20*a* is in the fully extended position illustrated in FIG. 3A. In this position, the incident angle of the table assembly as it approaches the patient (i.e., the angle between the plane formed by the left side bottom of lower table 20*b* and the plane formed by the leading portion of left side plate section 34) is in the range of 7°-10°. Lower belt 70*b* rotates in response to the drive mechanism in lower table 20*b*, and drives upper belt 70*a* as table assembly 20 crawls under the patient. The timing of the belts' rotation (eversion rate) is synchronized with the lateral movement of slide assembly 18.

Once the patient is positioned over the center of table assembly 20, motors 58 begin to actuate crank assemblies 50 which gradually retract side plate sections 34, 35. Since posts 60, 64 must follow guide slots 62, 66 in end plates 80 and since the guide slots are inclined upwardly toward the longitudinal centerline of table assembly 20, the retraction of left and right side plate sections 34, 35 also results in raising the side plate sections. As side plate sections 34, 35 rise, they lift ribs 38 which in turn raise central plate section 32, thereby separating upper table 20*a* from lower table 20*b*. An intermediate position with partial retraction of left and right side plate sections 34, 35 and partial separation of upper and lower tables 20*a*, 20*b* is shown in FIG. 3B. Disk 52 has rotated to bring the pivotally attached ends of linkage arms 54, 56 to a lateral centerline of disk 52, one above and one below. In this position, fingers 46 and edge rollers 48 of upper table 20*a* barely extend over the edge of lower table 20*b*, and there is significant slack in upper belt 70*a* although it is still in loose contact with lower belt 70*b*.

Outer guide slots 62 have a slightly higher angle of inclination (26°) than inner guide slots 66 (18°), so retraction of left and right side plate sections 34, 35 also results in lowering the inclination of the side plates, i.e., posts 60 will move vertically at a faster rate than posts 64. This action generally flattens the patient support surface of upper table 20*a* to make it more stable and reduce the likelihood of the patient rolling off to one side. The side plate inclinations continue to change as crank assemblies 50 rotate further until table assembly 20 reaches the fully retracted/separated position illustrated in FIG. 3C. Disk 52 has rotated further to bring the pivotally attached ends of linkage arms 54, 56 to opposing sides of disk 52, i.e., the end of left linkage arm 54 is at the right periphery of disk 52 and the end of right linkage arm 56 is at the left periphery of disk 52. Posts 60, 64 have moved to the inward ends of guide slots 62, 66. In this position, the upper surfaces of side plates 34, 35 are advantageously inclined only 2° from the horizontal, although they could be perfectly flat or even slightly inclined upward. Guide slots 62, 66 are 2.75" long, allow maximum lateral movement of each side plate section by 2.4" although the crank stroke is only 1.875", and result in maximum vertical movement of edge rollers 48 by 1.25".

This construction thus provides the integrated and synchronized movement of (i) the refraction of the side plate sections, (ii) the separation of the upper and lower tables, and (iii) the adjustment of the angle of the side plate sections. The result is smoother patient acquisition, and more comfortable and safe patient transport. While other means may be provided to achieve these actions such as gears, cams or 4-bar linkages, the use of end plates having guide slots with positioning posts on the side plate sections has fewer moving parts and can drive all the actions with only two motors for the crank assemblies.

Figure 5:
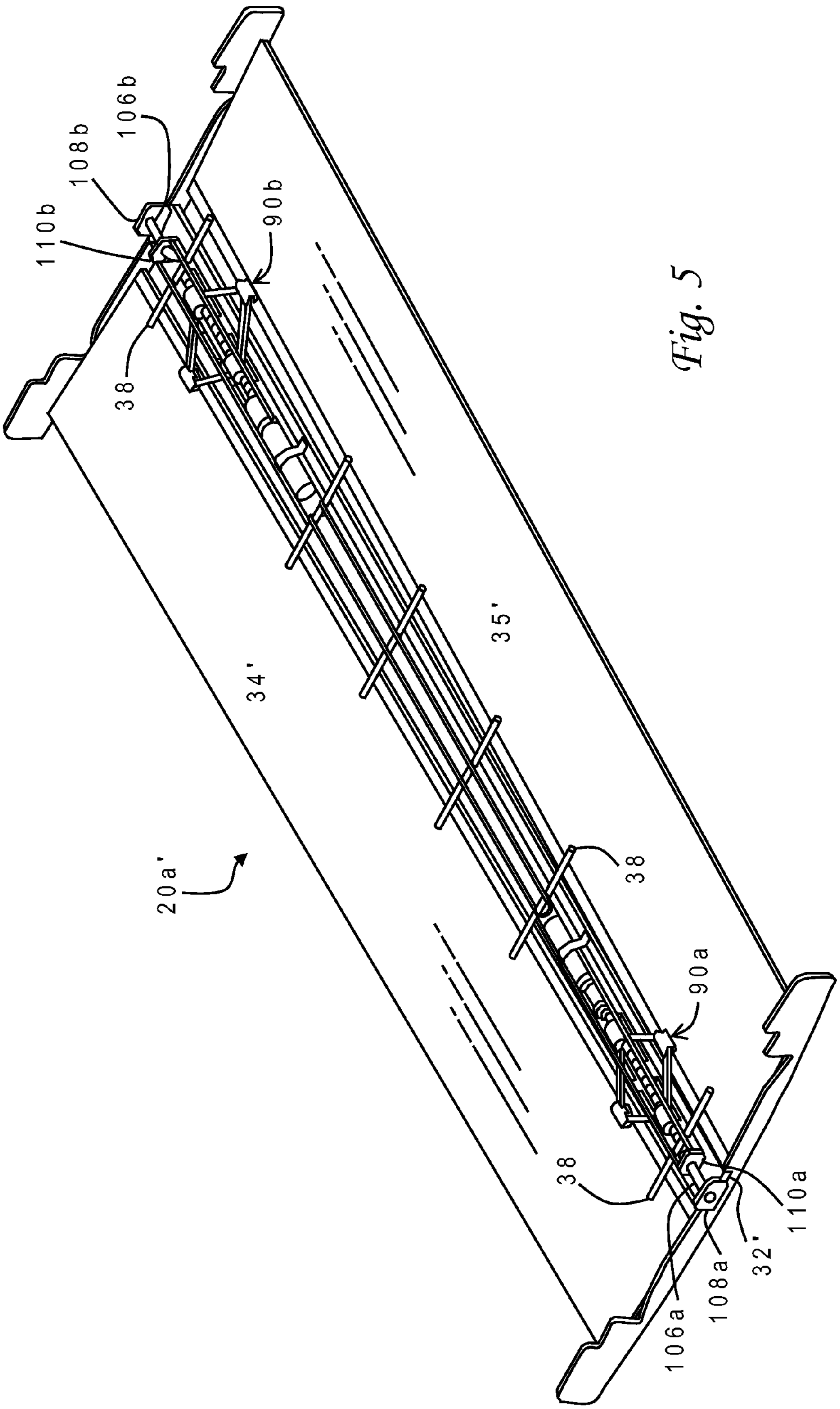
FIG. 5 is a bottom isometric view of an alternative embodiment for the upper table showing screw jack mechanisms which allow differential extension of the side plate sections.
Figure 6:
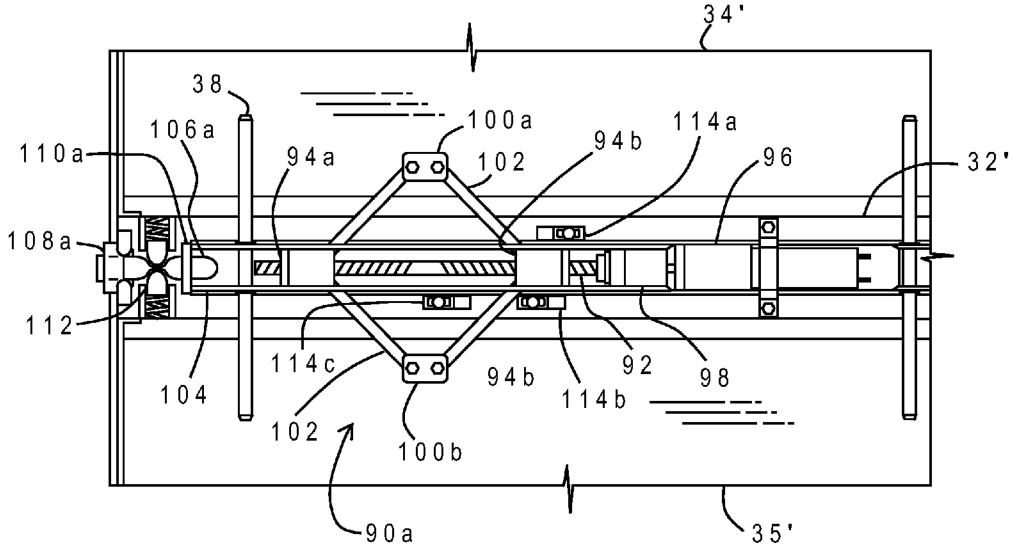
FIG. 6 is a bottom plan view detailing one of the screw jack mechanisms and an air supply tube valve which automatically closes as the side plate sections are retracted.

Additional improvements to the patient transfer device are shown in FIGS. 5-13. FIGS. 5 and 6 depict an alternative design 20*a*' for the upper belt table having an integrated mechanism for extension/retraction of the side wings and control of the valves which regulate the air supply to the comfort mattress. FIG. 5 is a bottom isometric view of upper belt table 20*a*' illustrating two screw jack mechanisms 90*a*, 90*b* at each end of the table. As further seen in FIG. 6, each screw jack mechanism 90*a*, 90*b* includes a lead screw 92 having right- and left-handed threads extending from its center to its ends, an outside nut 94*a* with an internal right-handed thread engaging the right-handed thread portion of lead screw 92, and an inside nut 94*b* with an internal left-handed thread engaging the left-handed thread portion of lead screw 92. Lead screw 92 is driven by an electrical motor and planetary gear box 96 which is coupled to a chuck 98 attached to one end of lead screw 92. The outside and inside nuts 94*a*, 94*b* are linked to push blocks 100*a*, 100*b* by four bars 102, i.e., each nut has two bars connected respectively to the two push blocks. Bars 102 are pivotally attached at the ends to the nuts and push blocks, and the push blocks are retained in circular cross-section passageways in their respective side plates, that is, push block 100*a* is retained inside the left side plate 34' and push block 100*b* is retained inside the left side plate 35'. Nuts 94*a*, 94*b* are slidably secured within a U-shaped extruded aluminum tube or bracket 104 which is affixed to the central plate section 32'. Motor 96 is fastened within bracket 104, and bars 102 pass through slots formed along the side of tube 104. In this manner, when motor 96 is energized lead screw 92 will rotate causing nuts 94*a*, 94*b* to move linearly in opposite directions, thereby extending or retracting push blocks 100*a*, 100*b* and hence side plates 34', 35' according to the rotational polarity of motor 96. The side plates 34', 35' may again be supported by transverse rods 38 which are secured to one or more pieces of the U-shaped aluminum tubing 104.

FIGS. 5 and 6 also depict two sections of flexible rubber (polymeric) tubing 106*a*, 106*b* which draw off air from the comfort mattress that is inflated when the patient is being transported. Tubing 106*a* is disposed at one end of upper belt table 20*a*' and tubing 106*b* is disposed at the opposite end. The sections of tubing 106*a*, 106*b* enter upper belt table 20*a*' through holes in respective support blocks 108*a*, 108*b* and are further retained by guide blocks 110*a*, 110*b*. Support blocks 108*a*, 108*b* and guide blocks 110*a*, 110*b* are secured to central plate section 32'. After passing through guide blocks 110*a*, 110*b* the sections of tubing 106*a*, 106*b* turn upward and connect to respective inlet/exhaust ports of the air mattress.

The present invention may advantageously provide automatic valve control for these sections of tubing which is synchronized and integrated with the extension/retraction of the side plates. In the illustrative embodiment this integrated mechanism uses two pinch blocks 112 (FIG. 6) which are coupled to the left and right side plates 34', 35' on either side of a pneumatic tubing section. Each pinch block 112 is retained between two guide walls which are affixed to one of the side plates at the inner edge thereof. A spring is contained within the guide walls with one end of the spring mounted to the side plate inner edge. The other end of the spring biases the pinch block toward the longitudinal centerline of upper belt table 20*a*', to forcibly push against the flexible tubing section. The forward surface of a pinch block 112 that contacts the tubing preferably has a radiused edge to focus the pinching action. Thus, when the adjacent screw jack mechanism is fully refracted the tubing valve becomes closed, i.e., the pinch blocks compress the tubing on either side to form a seal and restrict air flow. Means are provided to limit the forward motion of pinch blocks 112 such as inwardly extending flanges at the free ends of the guide walls which abut a stop feature at the rear end of the pinch blocks. When the screw jack mechanism is fully extended the pinch blocks are no longer in contact with the tubing (i.e., the valve is open) and air is free to flow through the tubing section. Accordingly, when the side plates are extended the air mattress may be deflated under the weight of the patient, and when the side plates are retracted the air mattress may be substantially inflated through tubing sections 106*a*, 106*b* or using separate filler tubes (not shown) connected to respective entry ports, and will remain inflated while tube sections 108*a*, 108*b* stay closed.

The screw jacks 90*a*, 90*b* at each end of upper belt table 20*a*' are independently actuated by separately energizing their respective motors. FIG. 5 illustrates how one end of upper belt table 20*a*' may be wider than the other for the intermediate position of the side plates because screw jack 90*a* is retracted while screw jack 90*b* is slightly extended. This differential extension of side plates 34', 35' when combined with the aforementioned automatic valve control further allows the improved patient transfer device to selectively begin inflation/deflation of one portion of the air mattress prior to inflation/deflation of another portion.

Further, the air mattress may be inflated from either end with a single compressed-air blower source connected to that end of the mattress through one of the aforementioned pinch valve assemblies while it is in its open condition, and while the pinch valve assembly at the opposite end is in its closed condition. When it is desired to quickly deflate the air mattress, both pinch valve assemblies can be opened, and air from the mattress is exhausted out each end of the mattress. In another embodiment, the air mattress may include a body portion that is separately inflatable from a wedge portion that inclines the patient's head and shoulders, i.e., the tubing section at one end is used to first fill the wedge portion and the tubing section at the other end is used subsequently to fill the body portion.

To accurately control the stopping positions of the right and left side plates 34' and 35', three electromagnetic sensors 114*a*, 114*b*, 114*c* are located along the path of motion of nut blocks 94*a* and 94*b* at each screw jack mechanism. These sensors provide positional information to an electronic control system for motors 96 which is responsive to operator input commands for patient acquisition and delivery. Sensor 114*a* provides a first signal indicating when the screw jack is in the fully retracted position; sensor 114*b* provides a second signal indicating when the screw jack is in a transitional position where the pinch valves are essentially open, but the left and right side plates are only partially extended; and sensor 114*c* provides a third signal indicating when the screw jack is in the fully extended position.

For patient acquisition, table assembly 20' is extended from a side of the patient transfer device while counter-rotating the upper and lower belts to cause the table assembly 20' to move between the patient and the patient support surface while the side plates are in a fully extended position. Side plates 34', 35' are then partially retracted to a transitional position where both pinch blocks 112 are open. Side plates 34' and 35' are then fully retracted at one end closing the tubing section at that end of the device while the tubing section at the other end of the device remains at least partially open, similar to FIG. 5. The air mattress is then filled through the open pinch valve, and air is prevented from exhausting out the opposite end of the mattress because the pinch valve at that end is fully closed. When the mattress is fully filled, the remaining open pinch valve is closed by fully retracting the side plates 34' and 35', i.e., by actuating the appropriate screw jack mechanism at that end of the belt table.

Figure 7:
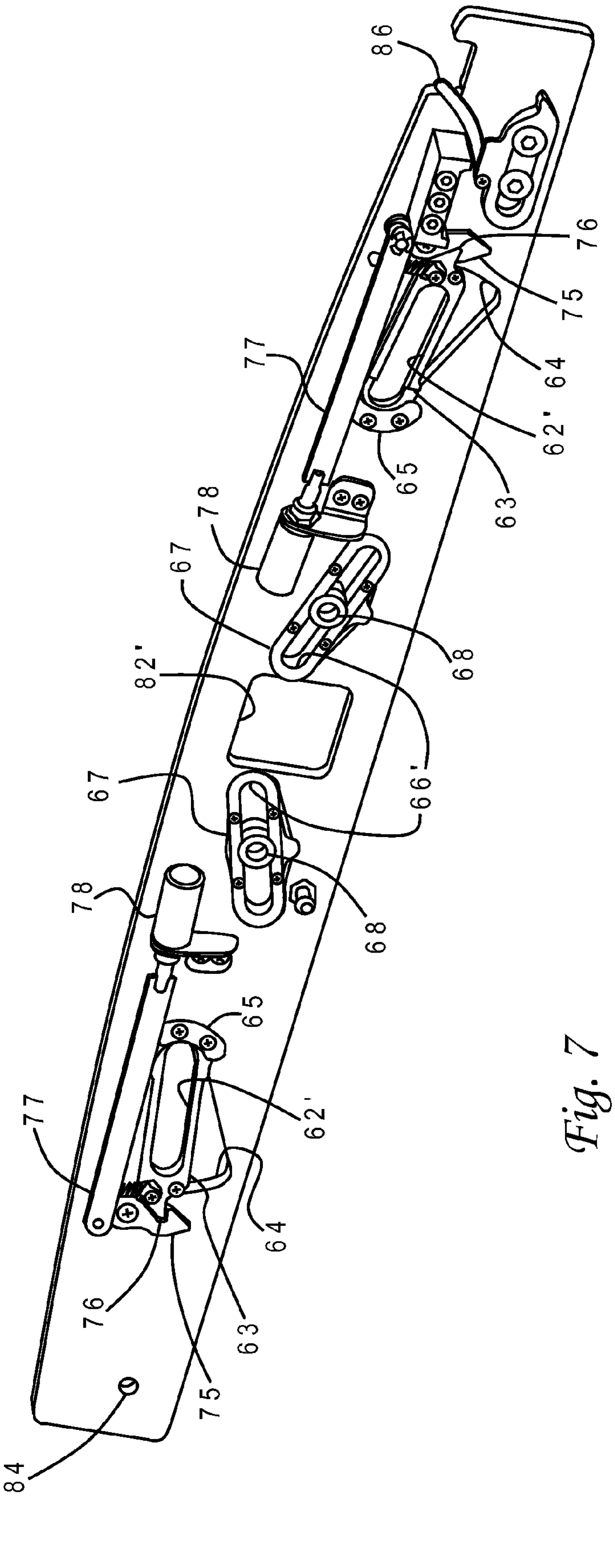
FIG. 7 is a perspective view of an alternative embodiment for the upper table end plate having pivoting guide slots with solenoid actuation.

With further reference to FIG. 7, an alternative design 80' for the upper table end plates is shown which is used to selectively raise only one of the side plate edges slightly as the patient is being delivered. During patient delivery using the counter-rotating upper and lower belts, there may be a tendency for a bed sheet, clothing or linens to be pulled into the nip formed between the upper and lower edge rollers. This tendency only occurs during discharge portion of the patient delivery cycle because the upper and lower belts move together between the upper and lower belt tables in a direction that makes them move toward the center of the belt table assembly 20, which can cause the belts to catch and pull loose objects in the nip and between the upper and lower belts, as illustrated by the arrows in FIG. 8. On a patient acquisition cycle this is not a problem because the belts are moving together between the upper and lower belt tables in a direction that makes them move away from the center of the belt tables, and thus cause loose materials to be pushed away from the nip area between the belts. Slightly separating the edge rollers during the discharge portion of the patient delivery cycle avoids catching fabrics in this nip. Upper table end plates 80' accomplish this movement using outer end plate support slots that adjust between raised and lowered positions.

Upper table end plate 80' has generally the same overall size and shape as end plate 80 of FIG. 4, and includes two similar fixed inner slots 66' defined by inner slot brackets 67 attached to end plate 80'. Inner slot brackets 67 slidably capture bearings 68 which support inner positioning posts affixed to respective side plates 34', 35'. Inner slot brackets 67 are located far enough inward (centrally) to avoid contact between the inside edge of the upper table sections and the lower table. Adjustable outer slots 62' are defined by outer slot brackets 63 which are located within wedge-shaped cutouts 64. One end of each outer slot bracket 63 fits into a cylindrical socket surrounded by capture plates 65, so each outer slot bracket 64 is free to pivot about the captured end within its wedge-shaped cutout 64. Outer slots 62' support outer positioning posts affixed to respective side plates 34', 35'. End plate 80 also has a larger cutout 82' which receives a support block 108.

When a patient is supported on the upper belt table and the side plates are extended, the weight of the patient will normally force the outer positioning posts downward, thereby pushing the free ends of outer slot brackets 64 to a lowered position within wedge-shaped cutouts 64. However, outer slot brackets 64 may be selectively retained in a raised position using clasps 75 having hooks which secure latches 76 formed on the free ends of outer slot brackets 64. Each clasp 75 is rotatably mounted to end plate 80' near the upper outside corner of wedge-shaped slot 64 and biased to the retaining position by a spring. The end opposite the hook is pivotally attached to one end of a respective rod 77, and the other end of a rod 77 is affixed to an output shaft of a respective solenoid 78. In this manner, when a given solenoid 78 is energized it pulls the rod 77 which causes clasp 75 to actuate into a release position, thereby allowing the outer slot bracket 64 to fall to the lowered position.

Figure 8:
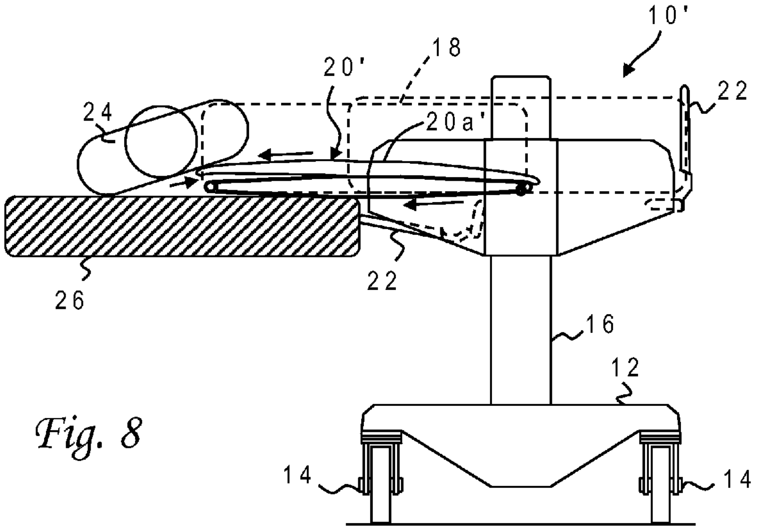
FIG. 8 is a front elevational view of an alternative embodiment for the patient transfer device which uses the upper table end plates of FIG. 7 to selectively raise one side plate edge slightly during patient delivery in order to avoid catching linens in the nip between the upper and lower belts.

Solenoids 78 are independently energized to select which of the side plates will be raised during the discharge portion of the patient delivery cycle. There are a total of four solenoids 78, two on each upper belt table end plate 80', so two of the solenoids that are located on the same side (one on each end plate) are energized to maintain that side edge of the upper belt table raised. This delivery configuration is illustrated in FIG. 8 with the end plate removed to show how the delivery side of the upper belt table 20*a*' of table assembly 20' (in this view, the left side) is raised while the driving (right) side of the upper belt table is lowered to offload the patient. Raising the delivery side avoids catching linens or clothing in the nip formed between the upper and lower belts, while the other side is lowered to retain the belts in forcible contact so that movement of the lower belt can still be used to drive the upper belt. The same electronic control system used for motors 96, which is responsive to operator input commands for patient acquisition and delivery, may be used to energize the selected solenoids.

Figure 9:
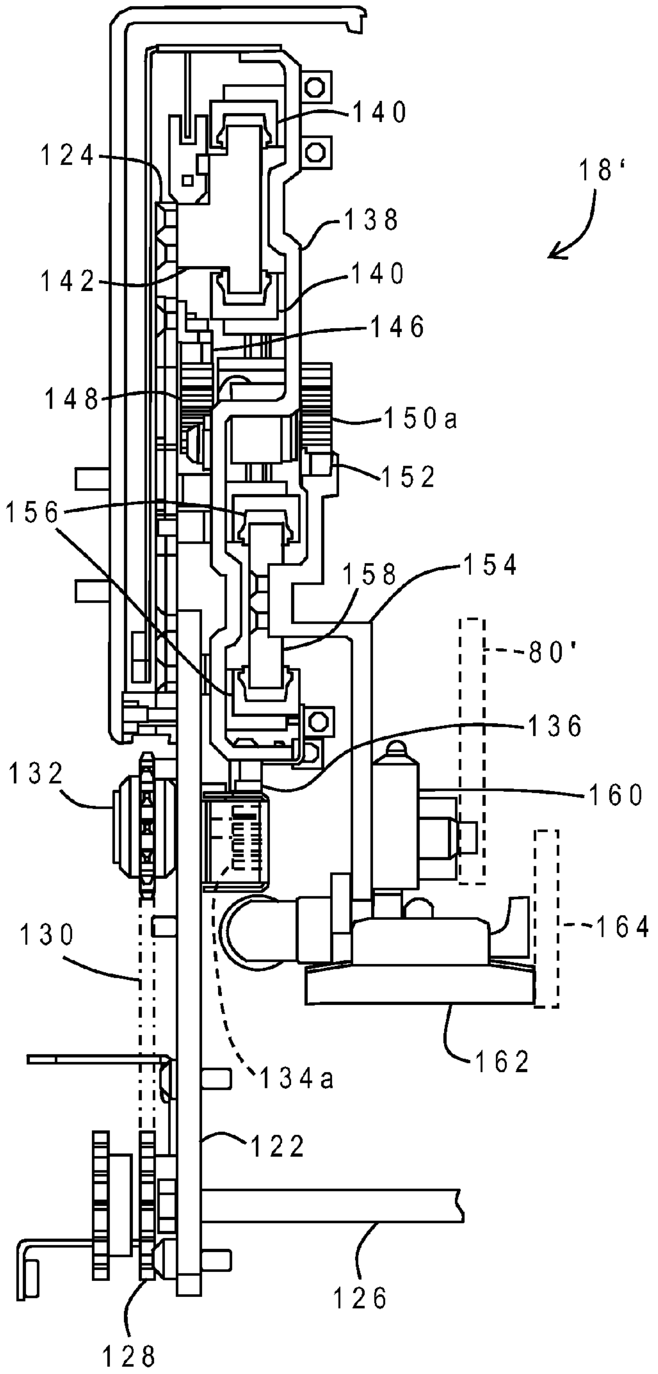
FIG. 9 is a side elevational view of an alternative embodiment for a slide assembly for the patient transfer table which includes a chain drive and a series of pinions and racks that provide hyperextension of the table.

Referring now to FIGS. 9 and 10, there is depicted an improved horizontal slide assembly 18' for supporting and moving the table assembly between centered (home) and extended (acquisition/delivery) positions. Only one slide assembly 18' is shown but two slide assemblies 18' are provided on the device, one at each end. The two slide assemblies 18' are essentially identical and are symmetrical about the transverse centerline of the patent transfer device.

Slide assembly 18' includes a first fixed plate 122 which is secured to one of the vertical support columns 16 that are attached to the device base, and one end of the belt table sub-frame (not shown) of the patient transfer device. Plate 122 is referred to as fixed in that it does not move horizontally; however, the entire belt table assembly and its sub-frame may be raised or lowered vertically to dispose the table assembly at approximately the same level of the bed or table where the patient lies, so plate 122 will similarly be raised or lowered. Plate 122 is bolted to a second fixed plate 124 which again may move vertically with the frame but does not move horizontally. One end of a bearing-mounted cross-shaft 126 is rotatably attached to fixed plate 122. Cross-shaft 126 extends approximately the full length of the patient transfer device with the other end being rotatably attached to a fixed plate 122 of the opposite slide assembly in anti-friction bearings. Cross-shaft 126 which is centrally located within the belt table sub-frame is preferably driven by an electric motor with an integral gear box (not shown). The electric gear motor is also attached to the belt table sub-frame, and drives the cross-shaft through a chain and sprocket drive system. Those skilled in the art will appreciate that the two fixed plates 122, 124 could be replaced by a single fixed plate.

A drive sprocket 128 is attached to and rotates with cross-shaft 126. A first chain 130 is wrapped around drive gear 128 and around two pinion sprockets rotatably mounted to the outside of fixed plate 122; only one of the pinion sprockets 132 is visible in FIG. 9 as it obscures the view of the second sprocket behind it. Two pinions 134*a*, 134*b* (FIG. 10B) on the inside of plate 122 are respectively attached to and rotate with the axles of the pinion sprockets 132. When cross-shaft 126 is rotated, it accordingly drives chain 130 which impels pinions 134*a*, 134*b*. Pinion 134*a*, 134*b* are engaged with a first rack 136 that is affixed to an intermediate plate 138. Intermediate plate 138 is also supported by two parallel U-shaped aluminum extrusions 140 attached to mounting brackets which are further attached to intermediate plate 138. Each U-shaped extrusion 140 contains U-sections constructed of a polymer or copolymer material having a low coefficient of friction, such as polytetrafluoroethylene (Teflon) or low-density polyethylene. The U-sections slidably fit tongue-and-groove with top and bottom rails of a first generally horizontal bar 142 which is bolted to fixed plate 124. Thus, as pinion 134 rotates, rack 136 moves linearly to the left or right depending upon the direction of rotation of cross-shaft 126, and bar 142 horizontally guides the resulting lateral movement of intermediate plate 138.

A second rack 146 is attached to fixed plate 124 and engages two pinions rotatably mounted to the outside of intermediate plate 138; only one of these pinions 148 is visible in FIG. 9 as it obscures the view of the second pinion behind it. Another set of pinions 150*a*, 150*b* are rotatably mounted to the inside of intermediate plate 138 on common axles with respective pinions 148. Pinions 150*a*, 150*b* engage a third rack 152 which is attached to a full-motion plate 154. A second chain 144 (FIGS. 10A and 10B) is wrapped around sprockets also mounted on the axles of pinions 150*a*, 150*b* to keep those pinions synchronized, i.e., meshing properly with rack 152. Full-motion plate 154 is also supported by two parallel U-shaped aluminum extrusions 156 attached to mounting brackets which are further attached to intermediate plate 138. The U-shaped extrusions 156 again contain U-sections constructed of a low-friction material which slidably fit tongue-and-groove with top and bottom rails of a second generally horizontal bar 158 which is bolted to full-motion plate 154. In this manner, as intermediate plate 138 is extended (by force of pinions 134*a*, 134*b* acting on rack 136), pinions 148 also rotate from engagement with fixed rack 146 which further causes pinions 150*a*, 150*b* to rotate, thereby moving rack 152 linearly while bar 158 horizontally guides the resulting lateral movement of full-motion plate 154. Full-motion plate 154 moves the same direction as the movement of intermediate plate 138 but at twice the rate relative to the frame.

Two mounting blocks 160, 162 are bolted to full-motion plate 154. Mounting block 160 supports upper belt table end plate 80', and mounting block 162 supports an end plate 164 for the lower belt table. The entire movement of the slide assembly at one end of the patient transfer device is synchronized with the same movement of a slide assembly at the other end since a single cross-shaft 126 impels the rack-and-pinion drives at the same rate.

Figure 10A:
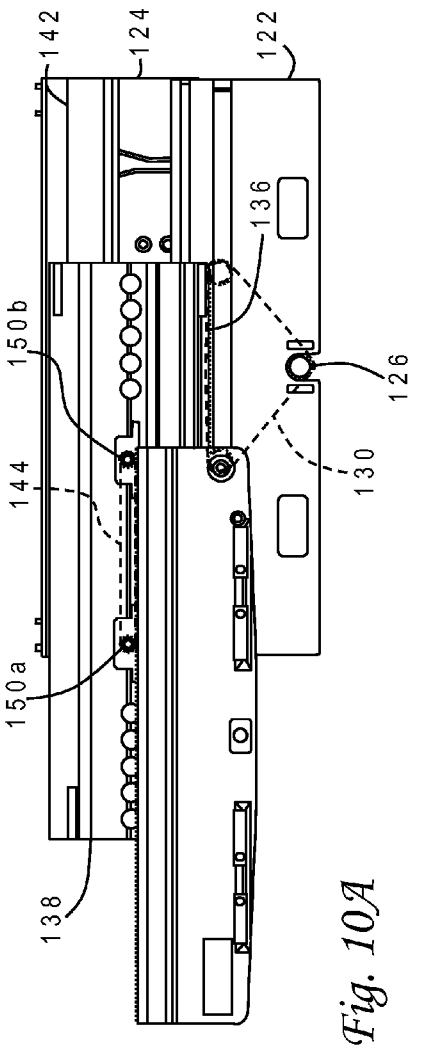
FIGS. 10A-10B are elevational views of the slide assembly of FIG. 9 shown at intermediate and full extension positions.
Figure 10B:
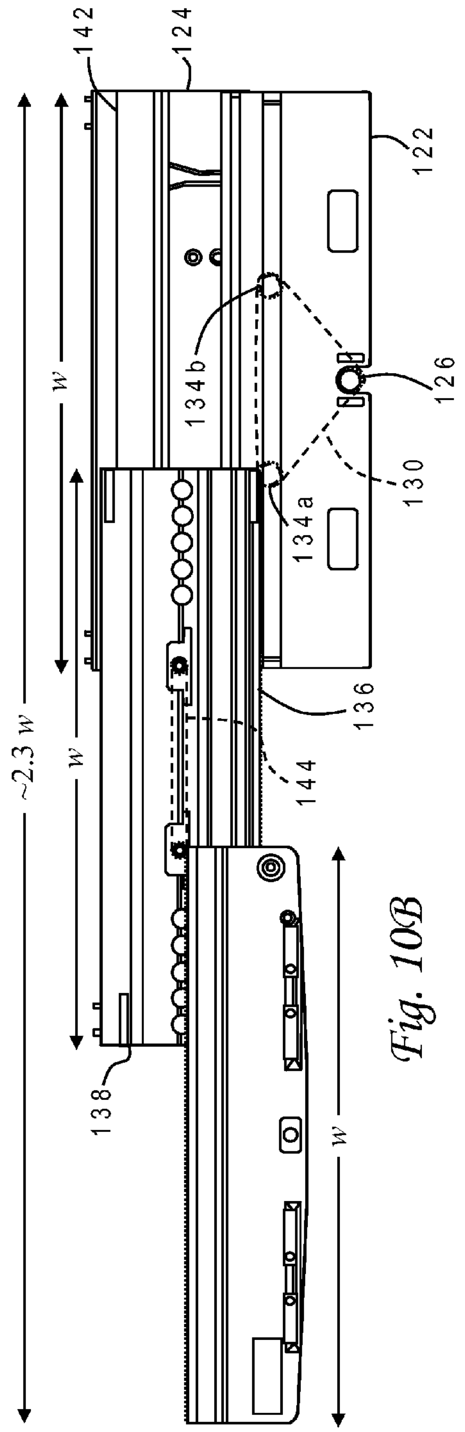

This construction allows for the hyperextension of table assembly 20', that is, lateral movement greater than the width (w) of the patient transfer device. FIG. 10A illustrates an intermediate extension of the slide assembly while FIG. 10B illustrates a full extension of the slide assembly. In this embodiment full-motion plate 154 moves approximately 1.3 times the width of the device, i.e., the outside edge of full-motion plate 154 is about 2.3 w from the opposite edge of fixed plates 122, 124 as shown in FIG. 10B. Stop blocks, abutting flanges or other means are provided to prevent the moving plates from sliding too far out.

The two slide assemblies 18' are also symmetrical about the longitudinal centerline of the patient transfer device, and the pinion pairs are located on opposite sides of the transverse centerline of their respective plates. In this manner table assembly 20' can hyperextend to either the left or right side by simply changing the polarity of the motor controlling cross-shaft 126.

Improvements to the steerage and propulsion system of the patient transfer device of the present invention are described with reference to FIGS. 11-13. FIGS. 11A through 11D are bottom plan views of one embodiment of the steerage and propulsion mechanism showing forward, turning, lateral, and stow positions, respectively. Four swiveling casters 170 are mounted to the chassis 172 of the patient transfer device generally proximate the four corners thereof. Horizontally disposed rubber bumpers 174 are rotatably mounted at the extreme corners of chassis 172 to avoid damaging walls as the device is moved from one location to another. Two drive wheels 176*a*, 176*b* are also provided along the longitudinal centerline of chassis 172, generally symmetrically opposite a transverse centerline of said chassis. Wheels 176*a*, 176*b* are impelled by respective right angle gear motors 178*a*, 178*b* which may be independently energized with different polarities, and each wheel and motor assembly rotates about a vertical axis as further described below in conjunction with FIGS. 12 and 13 to place the wheels in various orientations and propel the patient transfer device in different directions.

Figure 11A:
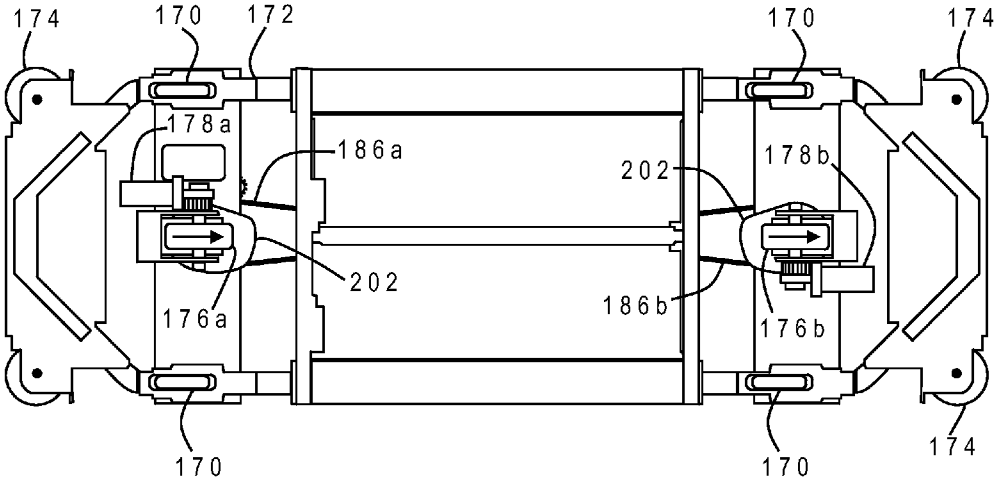
FIGS. 11A-11D are bottom plan views of one embodiment of a steerage mechanism constructed in accordance with the present invention showing forward, turning, lateral, and stowed positions of the two centerline wheels.

In the straight position shown in FIG. 11A, drive wheels 176*a*, 176*b* are generally aligned (parallel) with one another and with the longitudinal axis of chassis 172, and rotate in the same direction as indicated by the arrows to move the patient transfer device directly forward or backward with essentially no turning or transverse movement of the chassis. In the illustrative embodiment motors 178*a*, 178*b* are mounted on opposite sides (left/right) of the wheels and so are energized with opposite polarities for straight movement.

Figure 11B:
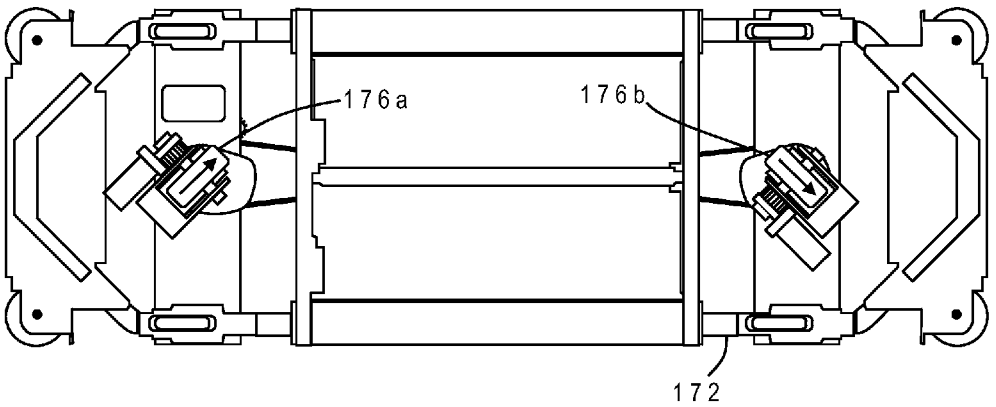

In the turning position shown in FIG. 11B, drive wheel 176*a* has rotated approximately 45° counterclockwise while drive wheel 176*b* has rotated approximately 45° clockwise, i.e., the wheels are counter-rotated from the straight position of FIG. 11A. For the turning position the respective polarities of the motors 178*a*, 178*b* are still the same as that for the straight position according to this embodiment. Wheels 176*a*, 176*b* may be rotated anywhere with a steering band of about ±45° (or other acute angle) to provide a variable turning radius.

Figure 11C:
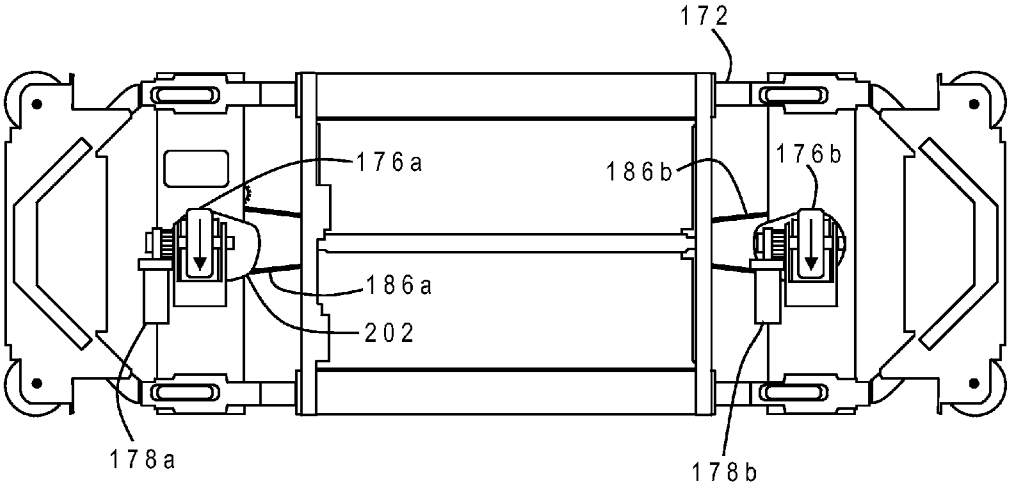

In the lateral movement position shown in FIG. 11C, drive wheel 176*a* has rotated approximately 90° counterclockwise from the straight position, and drive wheel 176*b* has rotated approximately 90° clockwise from the straight position, i.e., the wheels are further counter-rotated from the turning position. In this position the wheels are generally parallel with one another but orthogonal to the longitudinal axis of chassis 172, so the device can move only to the left or right with essentially no rotation or longitudinal movement. For this lateral steering mode the polarity of one of the motors 178 must change. For the movement illustrated in FIG. 11C by the downward pointing arrows, the polarity of motor 178*a* has changed from the straight and turning positions, while the polarity of motor 178*b* remains the same. For this particular motor configuration the motors are accordingly energized with the same polarity to achieve lateral movement.

Figure 11D:
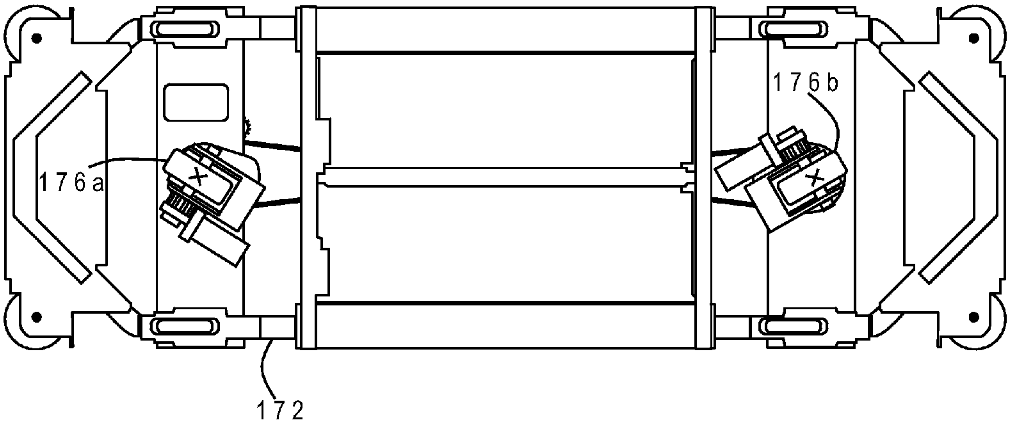

In the stow position shown in FIG. 11D, drive wheels 176*a*, 176*b* have moved approximately another 45° in their continued counter-rotation, that is, drive wheel 176*a* has rotated approximately 135° counterclockwise from the straight position, and drive wheel 176*b* has rotated approximately 135° clockwise from the straight position. In this position the wheels have been raised slightly above the floor, i.e., the plane defined by the bottom of casters 170, by a camming mechanism described further below in conjunction with FIG. 13. The wheel motors are deactivated in this stow mode and with the swiveling casters the patient transfer device may be manually pushed in any direction.

Figure 12:
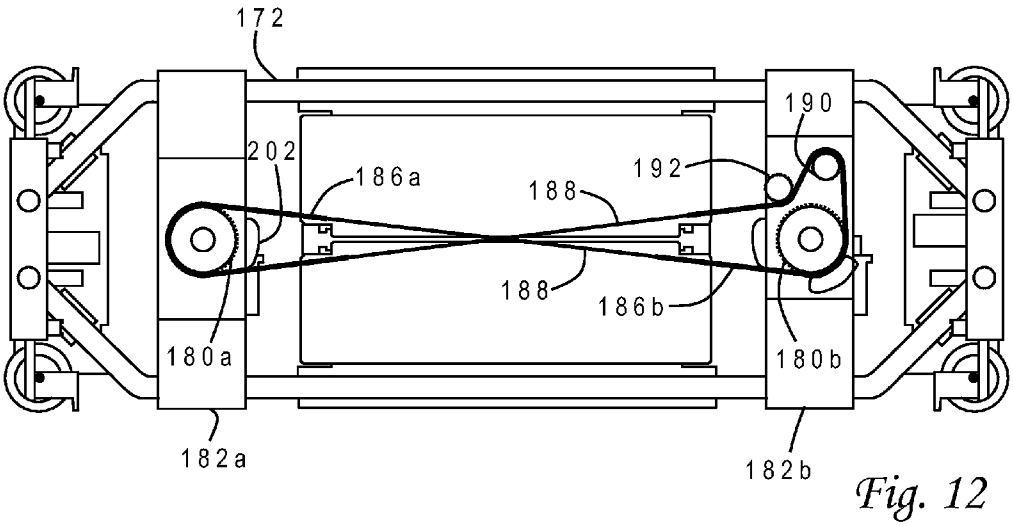
FIG. 12 is a top plan view of the steerage mechanism of FIGS. 11A-11D illustrating the chain and rod drive that rotates the wheels.

FIG. 12 illustrates a top plan view of the unified chain drive that is used to rotate the wheel and motor assemblies through the four positions showed in FIGS. 11A-11D. The chain drive includes two horizontally-disposed main steering sprockets 180*a*, 180*b* rotatably mounted atop respective cross-support plates 182*a*, 182*b*. Each main steering sprocket is affixed to a vertical shaft 184 (FIG. 13) which is rotatably supported by a bearing affixed to a cross-support plate. A first chain section 186*a* is wrapped around main steering sprocket 180*a*, and a second chain section 186*b* is wrapped around main steering sprocket 180*b*. Two connecting rods 188 are attached to the ends of chain sections 186*a*, 186*b* and overlap to form a figure-8 loop, so movement of the chain sections results in counter-rotation of the main steering sprockets. Chain section 186*b* is also wrapped around a motor drive sprocket 190 and against an idler sprocket 192. Motor drive sprocket 190 is coupled to an electric gear motor, preferably the same motor that impels cross-shaft 126. In this manner when the motor is energized and coupled to motor drive sprocket 190, chain section 186*b* moves causing main steering sprockets 180*a*, 180*b* to counter-rotate in synchronized motion according to the polarity of the motor.

Figure 13:
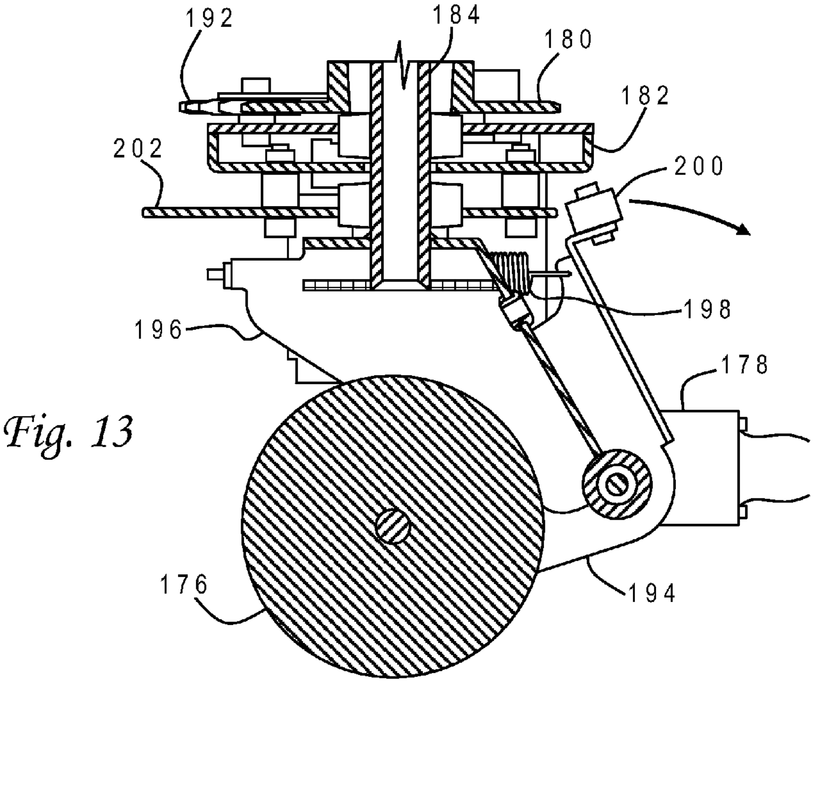
FIG. 13 is an elevational cross-section of one of the centerline wheels illustrating the pivoting bracket which rotates when a cam follower on the bracket contacts a stationary cam plate.

FIG. 13 illustrates the camming mechanism which raises the wheels when they are in the stow position. Wheel 176 and motor 178 are mounted to a pivoting bracket 194 which pivots in a vertical plane. Pivoting bracketing is pivotally attached to a wheel support bracket 196 which is affixed to the vertical rotating shaft 184. A spring 198 is connected at one end to wheel support bracket 196 and at the other end to pivoting bracket 194, and biases pivoting bracket counterclockwise in the view of FIG. 13, i.e., to a deployed position where wheel 176 is in contact with the floor. A cam follower 200 is attached to an upper edge of pivoting bracket 194 and is adapted to engage a stationary cam plate 202 bolted to cross-support plate 182. When wheel 176 is in the straight, turned, or lateral positions, cam follower 200 is not in contact with cam plate 202, but as wheel 176 is rotated past around 100° from the straight position cam follower 200 begins to forcibly abut the curved outer edge of stationary cam plate 202. As wheel 176 rotates toward a 135° rotation cam plate 202 forces cam follower outward with respect to vertical shaft 184 and thereby causes pivoting bracket 194 to pivot clockwise in the view of FIG. 13. As pivoting bracket 194 pivots it raises wheel 176 approximately 1" off the floor for stowage. In this mode, the patient transfer device can be manually pushed and guided around the healthcare facility. The steering mode in which the drive wheels are stowed may be useful in moving the patient transfer device in very limited space areas, or possibly in the event the main drive batteries are discharged sufficiently to prevent the device from moving under its own power.

The drive wheel system with its bias spring 198 also provides a relatively uniform downward force on the drive wheel that keeps the wheel in intimate contact with the floor as the wheel moves vertically during forward, reverse and lateral drive modes as the patient transfer device moves over dips, bumps, and other surface irregularities in the floor.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. The advantageous functionalities described herein may for example be attained in alternative designs using other mechanical means such as gears, shafts, sprockets, chains, levers, cams, latches, linkages, etc. and/or hydraulic means such as pumps, piston cylinders, motors, valves, rigid or flexible tubing, etc., which achieve these advantages. It is therefore contemplated that such modifications can be made without departing from the spirit or scope of the present invention as defined in the appended claims.

What is claimed is:

1. A steering mechanism for a transfer device, comprising:

a horizontal chassis;

a plurality of swivel casters attached to said chassis;

only two wheels located along a longitudinal centerline of said chassis, generally symmetrically opposite a transverse centerline of said chassis; and means for counter-rotating said wheels about vertical axes in synchronized motion to at least three positions including a straight position, a turning position and a lateral position, wherein said wheels are generally aligned with each other and with the longitudinal centerline of said chassis in the straight position, said wheels are counter-rotated from the straight position by an acute angle in the turning position, and said wheels are generally orthogonal to the longitudinal centerline of the chassis in the lateral position.

2. The steering mechanism of claim 1 wherein said wheels are impelled by respective motors which are independently energized with selected polarities to propel the transfer device when said wheels are in the straight position, the turning position or the lateral position.

3. The steering mechanism of claim 1 wherein said casters define a floor plane, and further comprising means for raising said wheels above the floor plane in a stow position to allow the transfer device to be freely steered in any direction.

* * * * *